(12) United States Patent
DeJong et al.

(10) Patent No.: US 8,760,745 B2
(45) Date of Patent: Jun. 24, 2014

(54) SUBSTRATE GUIDED RELAY WITH IMAGE COMPENSATION

(75) Inventors: Christian Dean DeJong, Sammamish, WA (US); Mark Champion, Kenmore, WA (US)

(73) Assignee: Microvision, Inc., Redmond, WA (US)

( * ) Notice: Subject to any disclaimer, the term of this patent is extended or adjusted under 35 U.S.C. 154(b) by 718 days.

(21) Appl. No.: 13/099,251

(22) Filed: May 2, 2011

(65) Prior Publication Data

US 2012/0281721 A1 Nov. 8, 2012

(51) Int. Cl.
  *G02B 26/02* (2006.01)
  *G02B 27/01* (2006.01)
  *H04N 9/31* (2006.01)
  *G02B 26/10* (2006.01)
  *G02B 26/12* (2006.01)
  *G02B 27/00* (2006.01)

(52) U.S. Cl.
  CPC ............. *G02B 26/105* (2013.01); *G02B 26/10* (2013.01); *G02B 2027/0118* (2013.01); *G02B 26/127* (2013.01); *G02B 27/0031* (2013.01); *G02B 27/01* (2013.01); *H04N 9/3155* (2013.01); *H04N 9/3129* (2013.01); *H04N 9/3182* (2013.01)

USPC .................. 359/223.1; 359/212.1; 359/199.1; 359/630; 345/214; 345/690

(58) Field of Classification Search
  CPC .. G02B 27/0179; G02B 27/01; G02B 27/017; G02B 27/0172; H04N 9/3155; H04N 9/315; H04N 9/3135; G03B 21/005; G03B 21/006; G03B 21/008
  USPC ............................................ 359/212.1, 223.1
  See application file for complete search history.

(56) References Cited

U.S. PATENT DOCUMENTS

| | | | |
|---|---|---|---|
| 7,061,450 B2 * | 6/2006 | Bright et al. | 345/7 |
| 7,589,316 B2 * | 9/2009 | Dunki-Jacobs | 250/235 |
| 2012/0120116 A1 * | 5/2012 | Seo et al. | 345/690 |

\* cited by examiner

*Primary Examiner* — Zachary Wilkes
(74) *Attorney, Agent, or Firm* — Kevin D. Wills

(57) ABSTRACT

A display system includes a substrate guided relay and a scanning projector. The scanning projector exhibits a brightness variation on a resonant scanning axis, and the substrate guided relay exhibits a brightness variation along a length of an output coupler. The scanning projector includes a brightness compensation circuit to compensate for both the brightness variation caused by the resonant scanning and the brightness variation along the length of the output coupler.

7 Claims, 6 Drawing Sheets

SUBSTRATE GUIDED RELAY WITH IMAGE COMPENSATION

FIELD

The present invention relates generally to display systems, and more specifically to display systems that utilize substrate guided relays.

BACKGROUND

In the field of substrate-guided optical image relays, reflective or diffractive elements may cooperate with the surfaces of a relatively thin substrate to guide image rays along the substrate to produce a viewing region. This may be used for example to couple an image produced by a scanning projector to the eye of a viewer in a near-to-eye display and/or to provide a thin form-factor such as a flat panel display.

DESCRIPTION OF EMBODIMENTS

Figure 1:
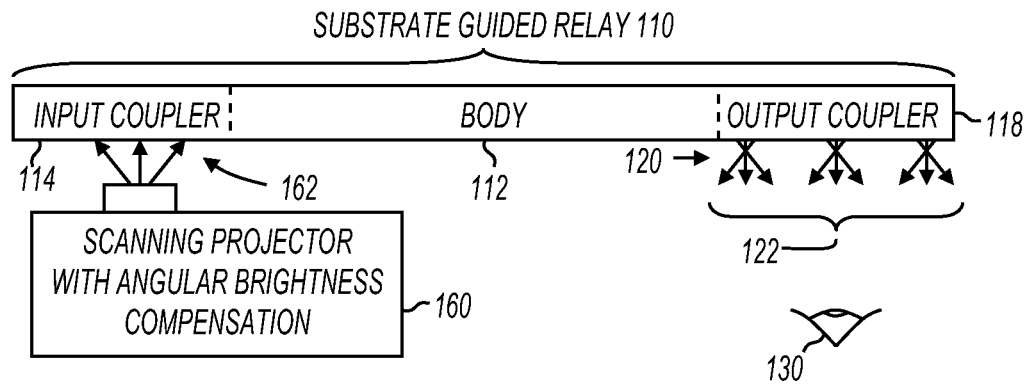
FIGS. 1, 2A, and 2B show cross sections of display systems with scanning projectors and substrate guided relays in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a cross section of a display system with a scanning projector and a substrate guided relay in accordance with various embodiments of the present invention. The system of FIG. 1 includes substrate guided relay 110 and scanning projector 160.

Substrate guided relay 110 includes a body portion 112, an input coupler 114, and an output coupler 118. Input coupler 114 receives light from scanning projector 160 and guides the light to the body portion 112. The light is guided along the body portion through total internal reflection. Upon reaching the output coupler 118, the light 120 is output from the substrate guided relay towards a viewing region 122, where it can be perceived by the eye of a viewer 130. The viewing region 122 may be defined by an exit pupil wherein substantially the entirety of the image may be perceived.

Input coupler 114 and output coupler 118 may be formed on or in substrate guided relay 110 in any manner. For example, in some embodiments, both the input coupler 114 and output coupler 118 are diffractive elements. In other embodiments, they are both holographic elements. In still further embodiments, input coupler 114 and output coupler 118 include reflective or partially reflective surfaces within the substrate guided relay. In some embodiments, the input coupler is absent and the light is inserted directly into the body of the substrate guided relay.

Scanning projector 160 scans a beam of light 162 through various angles to form a raster pattern, and modulates the light beam to paint pixels in the raster pattern. Pixels in the raster pattern are referred to as being "angle-mapped" because a unique angle (or combination of angles) of the light beam defines the location of each pixel in the raster pattern. Angle-mapped pixels are appropriate for transmission by substrate guided relay 110, in part because the angular information is maintained as the light rays propagate down the body and exit at the output coupler. That is, the image produced by the scanning projector is reproduced at the output coupler because the pixels are angle-mapped.

Scanning projector 160 includes brightness compensation circuits. For example, as described more fully below, the scanning projector may scan sinusoidally in at least one dimension, resulting in an increased perceived brightness at points within the raster pattern where the beam scanning slows. The brightness compensation circuits provide compensation for the perceived brightness variations that result from the sinusoidal beam scanning. Also for example, light 120 emerging from output coupler 118 may have a varying brightness as a function of position along the length of the output coupler. The brightness compensation circuits also provide compensation for brightness variations that result from variations along the length of the output coupler.

In some embodiments, the brightness compensation circuits modify the brightness of the light beam as a function of the angle of the light beam. For example, a scanning mirror within scanning projector 160 may undergo an angular displacement as it reflects the light beam. Information describing the angular displacement of the scanning mirror may be used by the brightness compensation circuits to determine the desired compensation.

Figure 2A:
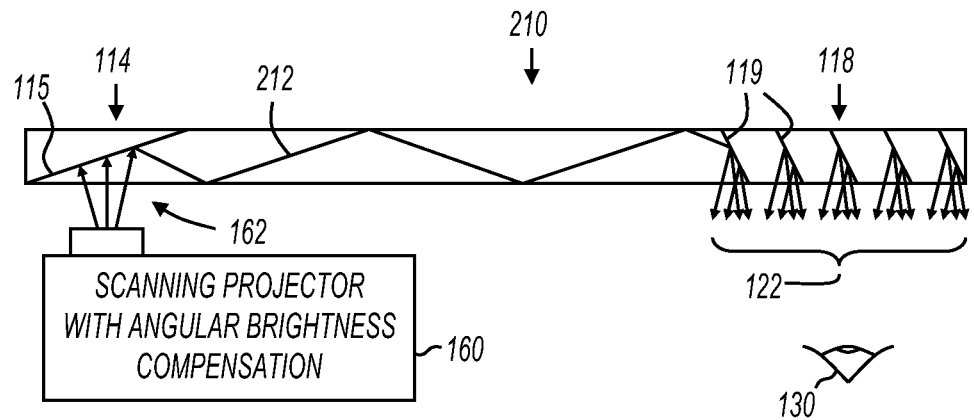
Figure 2B:
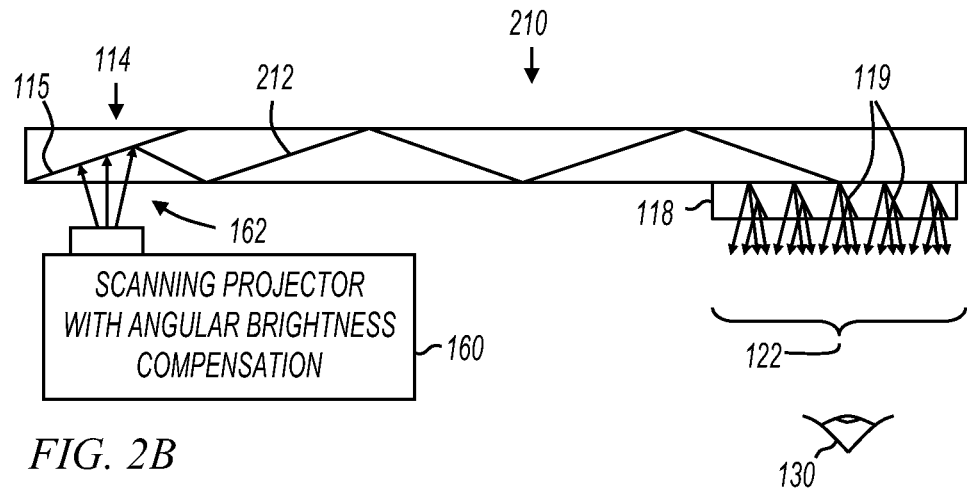

FIGS. 2A and 2B show cross sections of display systems with a scanning projector and a substrate guided relay in accordance with various embodiments of the present invention. The systems of FIGS. 2A and 2B include substrate guided relay 210 and scanning projector 160.

Substrate guided relay 210 includes input coupler 114 with reflective surface 115, and also includes output coupler 118 with partially reflective surfaces 119. In embodiments represented by FIG. 2A, output coupler 118 is formed within the body of the substrate guided relay 210, and in embodiments represented by FIG. 2B, output coupler 118 is formed on an exterior surface of the body of substrate guided relay 210.

The input rays are reflected by reflective surface 115 that directs the rays generally along the axis of the substrate guided relay 210. When rays are incident upon an edge of the substrate 210, they are reflected at an equal and opposite angle and continue down the substrate. After the rays have transited a transfer distance along the substrate, they are incident upon a series of partially reflective surfaces 119 that direct the rays toward a viewing region 122 where they can be perceived by the eye of a viewer 130. The viewing region 122 may be defined by an exit pupil wherein substantially the entirety of the image may be perceived. The distribution of the partially reflective surfaces 119 along the length of the substrate 210 may expand the exit pupil such that the extent of the exit pupil is larger than the extent of a first pupil defined by scanning projector 160. The distribution of the partially reflective surfaces 119 may result in an exit pupil that is substantially greater in dimension than the thickness of the substrate. According to some embodiments the overall length of the substrate may be approximately 30-100 millimeters and its thickness may be approximately 1-5 millimeters, although many other lengths and thicknesses are possible.

Reflective surface 115 of input coupler 114 is configured to direct the input rays generally toward the viewing end of the substrate guided relay 210, as indicated by the illustrative ray 212. The illustrative ray 212 may be successively reflected by the walls of the substrate guided relay 210 until it is incident upon the partially reflective surfaces 119 of output coupler 118. Reflective surface 115 launches rays into the substrate 210 along selected paths depending upon the input ray angle corresponding to the scanning light beam 162. The partially reflective surfaces 119 of output coupler 118 are configured to receive the launched rays, after the rays have reflected off the walls of the substrate 210 one or more times, and couple (i.e. launch) them out into the viewing region 122 for viewing by a viewer 130.

The remainder of this description refers to output couplers with partially reflective surfaces such as partially reflective surfaces 119, although this is not a limitation of the present invention. Various embodiments of the present invention may include substrate guided relays with different configurations of output couplers, including diffractive elements and/or holographic elements.

Figure 3:
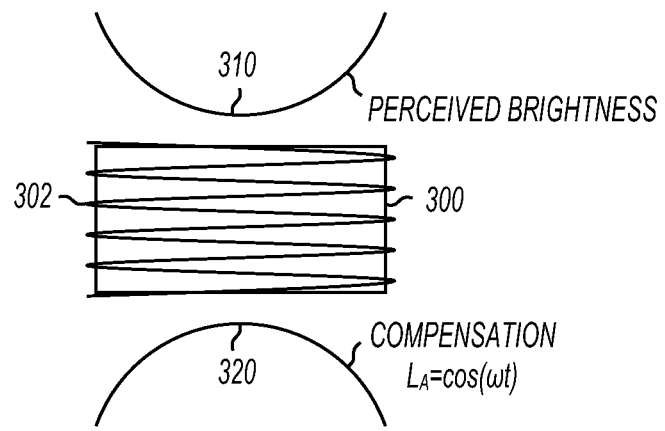
FIG. 3 shows a scan trajectory, perceived brightness of the scan trajectory, and brightness compensation for the scan trajectory in accordance with various embodiments of the present invention.

FIG. 3 shows a scan trajectory, perceived brightness of the scan trajectory, and brightness compensation for the scan trajectory in accordance with various embodiments of the present invention. Scan trajectory 302 shows the path of the scanning light beam on the surface 300 of the input coupler. Scanning projector 160 includes one or more angular scanning mirrors that reflect a light beam to create raster pattern 302.

Scanning projector 160 scans the light beam sinusoidally in at least one dimension. In the example of FIG. 3, the light beam is scanned sinusoidally in the horizontal dimension. In some embodiments, the scanning mirror scans at mechanical resonance to create the sinusoidal trajectory. The example of FIG. 3 also shows a linear scan in the vertical dimension, although this is not a limitation of the present invention. For example, in some embodiments, the scanning mirror(s) scan both dimensions sinusoidally.

When scanned sinusoidally, the scanning mirror does not exhibit a constant angular velocity. This results in the light beam scanning slower near the edges of the scan trajectory. Referring to the example of FIG. 3, the light beam scans slower near the left and right edges of the raster pattern than in the middle. In some embodiments, this results in a denser pixel pattern in the horizontal dimension, and an increased perceived brightness near the left and right edges of the image.

The nonuniform perceived brightness is shown at 310. Scanning projector 160 compensates for this nonuniform perceived brightness by decreasing the brightness of pixels near the left and right edges, and/or increasing the brightness of pixels near the center. One possible compensation function is shown at 320 as $$L_A = \cos(\omega t), \tag{1}$$

where $\omega$ is the oscillation frequency of the scanning mirror, and t is time. The quantity $\omega t$ is referred to herein as the "mirror phase" and represents the instantaneous phase value of the scanning mirror oscillation.

A trigonometric function is used herein as an example compensation function; however the present invention is not limited in this regard. In some embodiments, actual brightness is measured and the compensation function is a table of values that provide the inverse of the measured values.

Figure 4:
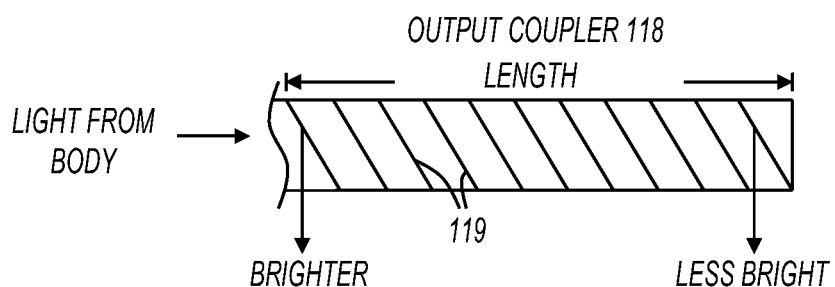
FIG. 4 shows a substrate guided relay output coupler, brightness variation along the length of the output coupler, and brightness compensation for the variation along the length of the output coupler in accordance with various embodiments of the present invention.
Figure 4:
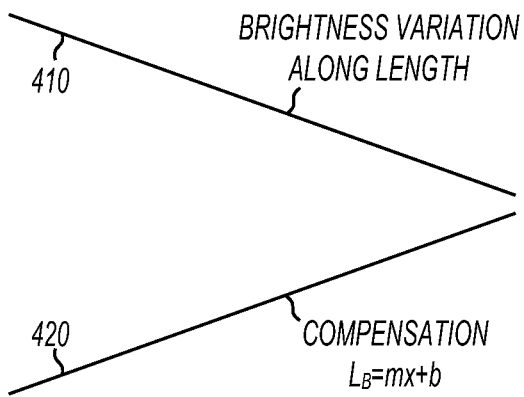

FIG. 4 shows a substrate guided relay output coupler, brightness variation along the length of the output coupler, and brightness compensation for the variation along the length of the output coupler in accordance with various embodiments of the present invention. Output coupler 118 receives light from the body of the substrate guided relay as described above with reference to FIGS. 1, 2A, and 2B. In some embodiments, the brightness of the light leaving the output coupler is not uniform across the length of the output coupler. For example, the brightness may decrease along the length of the output coupler 118 as successive partially reflective layers 119 are encountered by the light.

The brightness variation along the length of the output coupler is shown as being linear at 410, although this is not a limitation of the present invention. Many variables may contribute to the actual brightness variation along the output coupler length, including the reflectivity of the partially reflective layers 119, the material from which the output coupler is made, etc.

Scanning projector 160 compensates for this linear brightness variation along the length of the output coupler by decreasing the brightness of pixels near the left edge and/or increasing the brightness of pixels near the right edge as shown at 420. In the example of FIG. 4, where the brightness variation along the length of the output coupler is linear, the compensation is also linear, shown in FIG. 4 as:

$$L_B = mx + b \tag{2}$$

where x is the position along the length of the output coupler, and m and b are constants. Any compensation function may be utilized to compensate for brightness variations along the length of the output coupler. In some embodiments, the brightness variation is measured, and empirical data is used to create the compensation function.

Figure 5A:
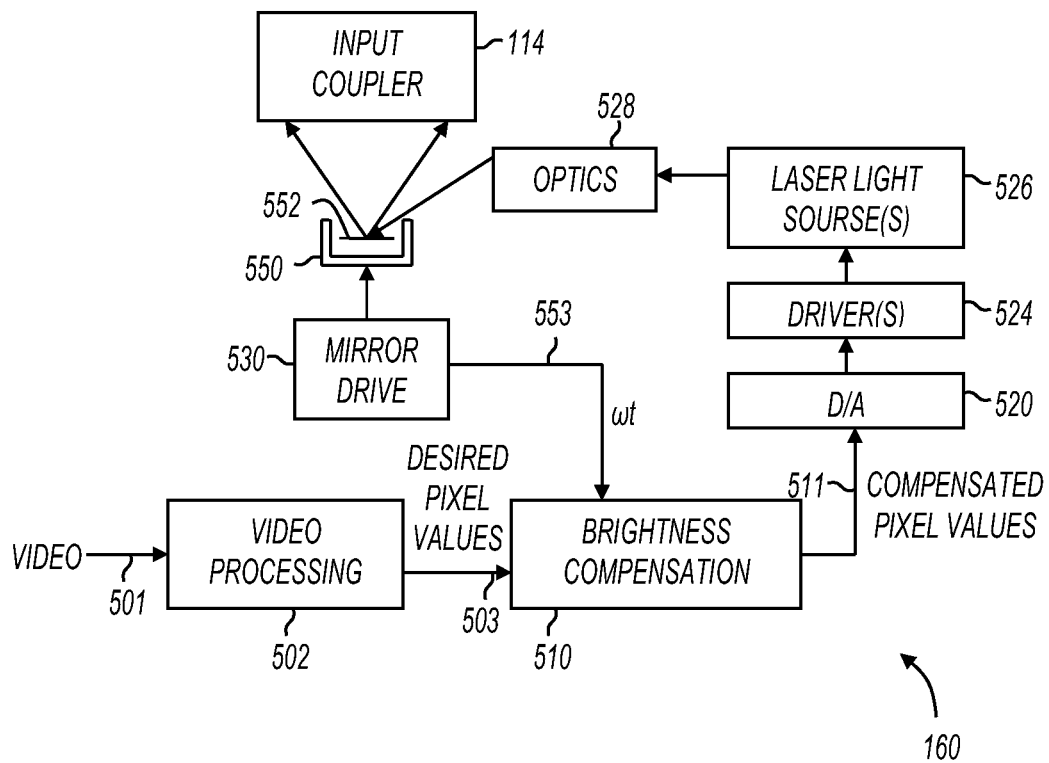
FIG. 5A shows a scanning projector with brightness compensation in accordance with various embodiments of the present invention.

FIG. 5A shows a scanning projector with brightness compensation in accordance with various embodiments of the present invention. Scanning projector 500 is an example laser projection display that may be included in a system such as the systems shown in FIGS. 1, 2A, and 2B. Scanning projector 160 includes video processing component 502, brightness compensation circuit 510, digital-to-analog converter(s) (D/A) 520, driver circuits 524, laser light source(s) 526, optics 528, mirror drive 530, and microelectromechanical (MEMS) device 550 with scanning mirror 552.

In operation, video processing component 502 receives video data on node 501. Video processing component 502 produces desired pixel brightness values that correspond to pixels to be displayed to form an image. The desired pixel brightness values may include values for one or more colors. For example, scanning projector may project color images, and the desired pixel values may include values for red, green, and blue brightness values. Video processing component 502 may include any suitable hardware and/or software useful to produce desired pixel values from video data. For example, video processing component 502 may include application specific integrated circuits (ASICs), one or more processors, or the like.

Brightness compensation circuit 510 receives the desired pixel brightness values on node 503 and modifies them in accordance with the compensation principles described above. For example, brightness compensation circuit 510 may modify the desired pixel values to create the compensated pixel values on node 511 that compensate for brightness variations caused by the scanning projector as well as the brightness variation along the length of the output coupler. Brightness compensation circuit 510 compensates pixel values as a function of the mirror phase ωt. Mirror drive 530 drives the scanning mirror 552 to cause oscillation, and provides the mirror phase to brightness compensation circuit 510 as shown in FIG. 5A.

Brightness compensation circuit 510 may be implemented in any manner without departing from the scope of the present invention. For example, in some embodiments, brightness compensation circuit 510 may be implemented using a look-up table in a memory device. Also for example, in other embodiments, brightness compensation circuit 510 may be implemented as a processor or application specific circuit that computes values in accordance with the trigonometric and/or linear equations described above.

D/A 520 receives the digital compensated pixel values on node 511 and produces analog values to drive driver(s) 524. Drivers 524 receive the analog values from D/A 520 and produce signals to drive laser light source(s) 526. In some embodiments, driver(s) include one or more transimpedance amplifiers to produce current to drive laser light source(s) 526.

Laser light source(s) 526 receive commanded drive signals from driver(s) 524 and produce light. In some embodiments, laser light source(s) 526 include multiple sources of different wavelength light. For example, in some embodiments, laser light source(s) 526 include red, green, and blue laser diodes. Each light source produces a narrow beam of light which is directed to scanning mirror 552 via optics 528. Scanning mirror 552 rotates on at least one axis in response to stimuli received from mirror drive circuit 530. As described above with reference to FIG. 3, scanning mirror 552 rotates sinusoidally on at least one axis. This may be at a mechanical resonant frequency of the scanning mirror. The sinusoidal movement of the scanning mirror on at least one axis results in a brightness variation that is compensated for by brightness compensation circuit 510. After reflecting off scanning mirror 552, the laser light paints an image on input coupler 114 as described above with reference to FIGS. 1, 2A, and 2B.

Figure 5B:
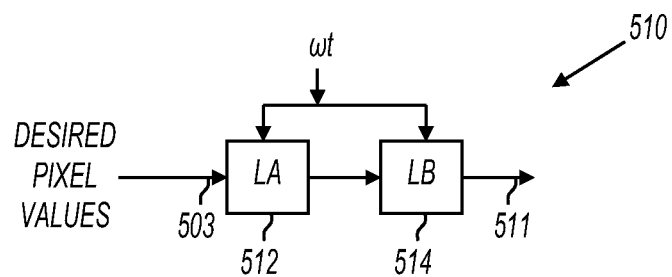
FIG. 5B shows a brightness compensation circuit in accordance with various embodiments of the present invention.

FIG. 5B shows a brightness compensation circuit in accordance with various embodiments of the present invention. Brightness compensation circuit 510 includes compensation components 512 and 514. Compensation component 512 applies compensation $L_A$ on desired pixel values on node 503. The compensation $L_A$ corresponds to compensating for the perceived brightness variation caused by the scanning projector. One example compensation function for $L_A$ is shown in equation (1) above, and is described with reference to FIG. 3.

Compensation component 514 applies compensation $L_B$ on pixel values previously operated on by compensation component 512. The compensation $L_B$ corresponds to compensating for the brightness variation along the length of the output coupler. One example compensation function for $L_B$ is shown in equation (2) above, and is described with reference to FIG. 4.

In some embodiments, one or both of compensation components 512 and 514 provide a gain value greater than unity for at least one mirror phase. For example, rather than only attenuating pixel values, one or both of the compensation functions may increase a pixel value. Although compensation components 512 and 514 are shown separately in FIG. 5B, this is not a limitation of the present invention. For example, a look up table may include values that combine the compensation functions of $L_A$ and $L_B$.

Figure 6:
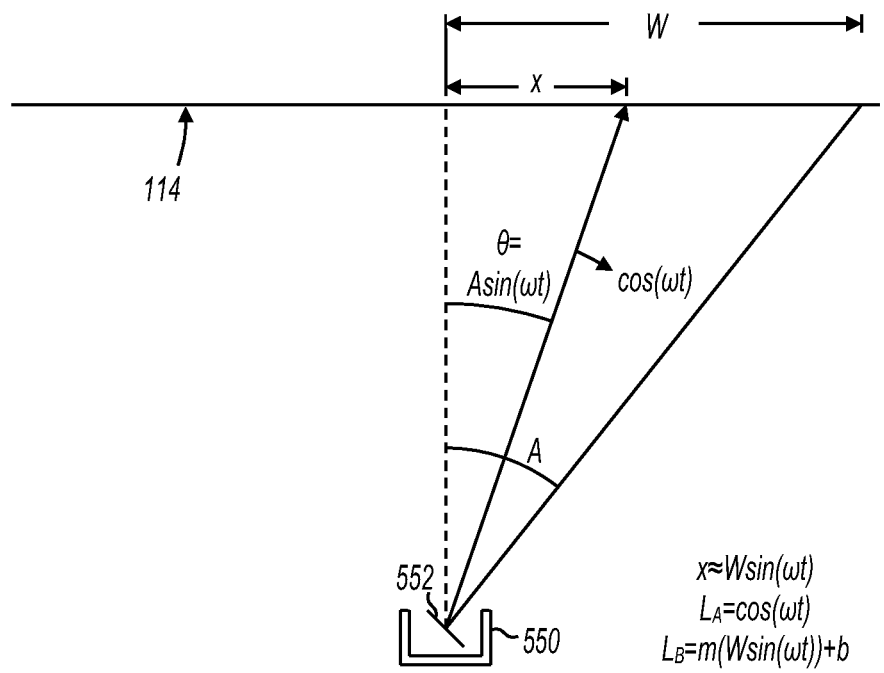
FIG. 6 shows an oscillating scanning mirror with an angular displacement in accordance with various embodiments of the present invention.

FIG. 6 shows an oscillating scanning mirror with an angular displacement in accordance with various embodiments of the present invention. MEMS device 550 is shown with scanning mirror 552 reflecting a light beam having a normalized angular velocity given by $$\cos(\omega t) \tag{3}$$

where ω is the oscillation frequency of the scanning mirror, t is time, and ωt is the mirror phase. The angle of the light beam at time t is given by $$\theta = A\sin(\omega t), \tag{4}$$

where A is the maximum scan angle. The position of the scanned beam on the input coupler is given by x, which is given by $$x = W\frac{\tan(A\,\sin(\omega t))}{\tan A}, \tag{5}$$

Where W is a constant related to the width of the image as shown in FIG. 6. The position of the scanned beam on the input coupler can also be approximated by $$x \approx W\sin(\omega t), \tag{6}$$

$L_A$ as a function of mirror phase is given by equation (1), repeated here $$L_A = \cos(\omega t), \tag{1}$$

and $L_B$ as a function of mirror phase is given by $$L_B = m(W\sin(\omega t)) + b, \tag{7}$$

where m and b are implementation dependent constants. The total angular brightness compensation is then given by the product $L_A * L_B$ as shown in FIG. 6. $L_A \times L_B$ may be implemented by brightness compensation circuit 510 as described above in FIGS. 5A and 5B.

Although $L_A * L_B$ are shown as a combination of linear and trigonometric functions, this is not a limitation of the present invention. For example, in some embodiments, $L_A$ and $L_B$ may be determined empirically by measuring the brightness of the scanning projector, measuring the brightness of light emerging from the output coupler, and the loading a look up table with scaled inverse functions.

Figure 7:
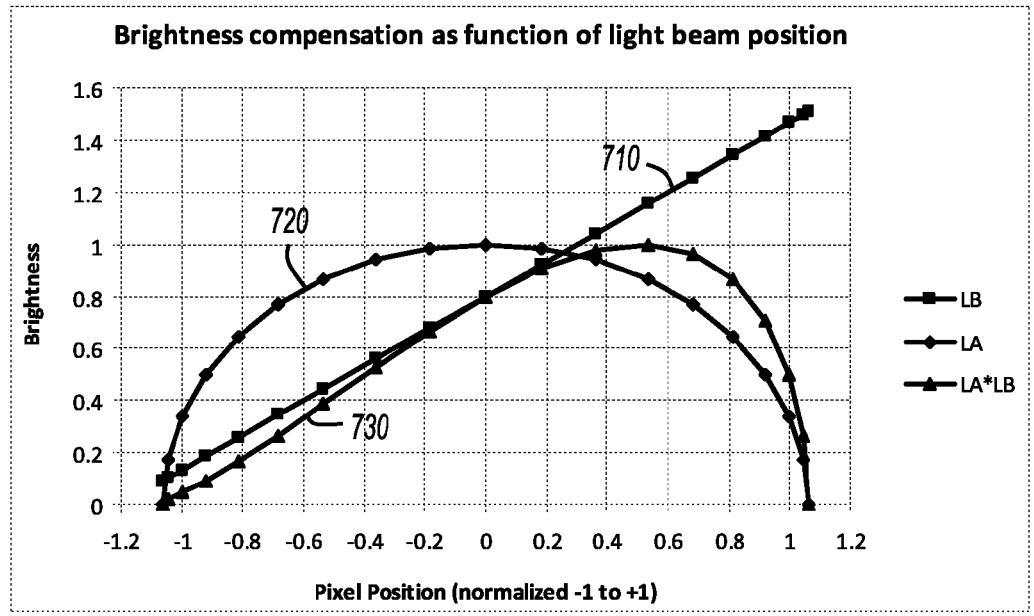
FIG. 7 shows brightness compensation as a function of light beam position in accordance with various embodiments of the present invention.

FIG. 7 shows brightness compensation as a function of light beam position in accordance with various embodiments of the present invention. Compensation function 710 corresponds to brightness compensation 420 (FIG. 4), and compensation function 720 corresponds to brightness compensation 320 (FIG. 3). The horizontal axis is scaled to equal x=sin(ωt) where ωt varies from −π/2 to +π/2 radians. Compensation function 730 combines the compensation functions 710 and 720, and is scaled so that it has unity gain as a maximum gain value.

Figure 8:
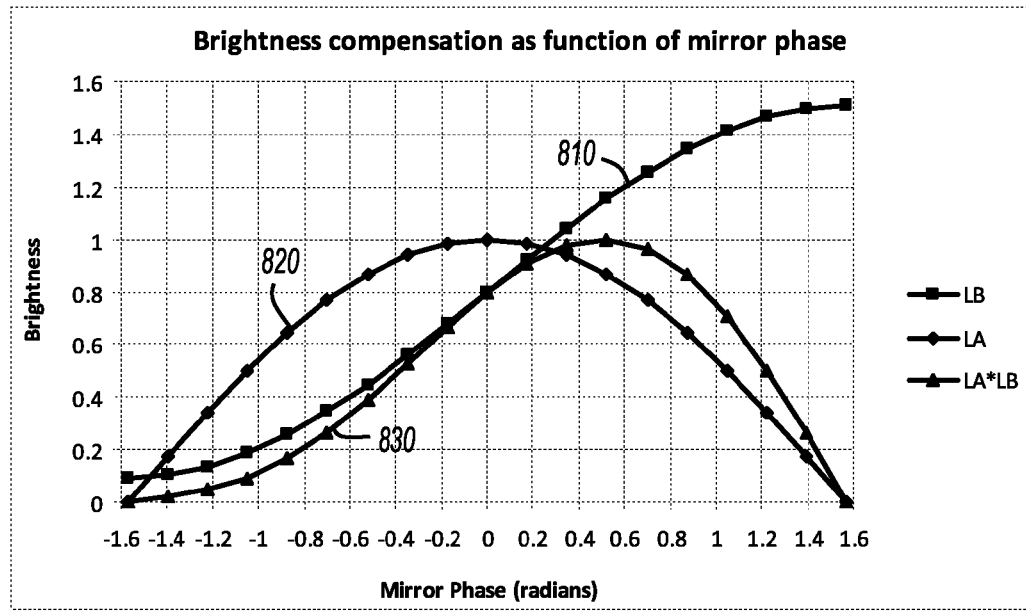
FIG. 8 shows brightness compensation as a function of mirror phase in accordance with various embodiments of the present invention.

FIG. 8 shows brightness compensation as a function of mirror phase in accordance with various embodiments of the present invention. Compensation function 810 corresponds to brightness compensation 420 (FIG. 4), and compensation function 820 corresponds to brightness compensation 320 (FIG. 3). The horizontal axis is scaled to equal the mirror phase ωt where ωt varies from −π/2 to +π/2 radians. Compensation function 830 combines the compensation functions 810 and 820, and b of equation (7) is picked to yield a maximum gain of unity.

As shown in FIGS. 7 and 8, the compensation function $L_B$ has greater than unity gain at at least one mirror phase. This is possible because at the same mirror phase, $L_A$ has a gain of less than unity. In some embodiments, $L_A$ has greater than unity gain at at least one mirror phase where $L_B$ has a gain of less than unity. The combination of $L_A$ and $L_B$ may be scaled such that the maximum gain over all mirror phase values is substantially equal to one.

Figure 9:
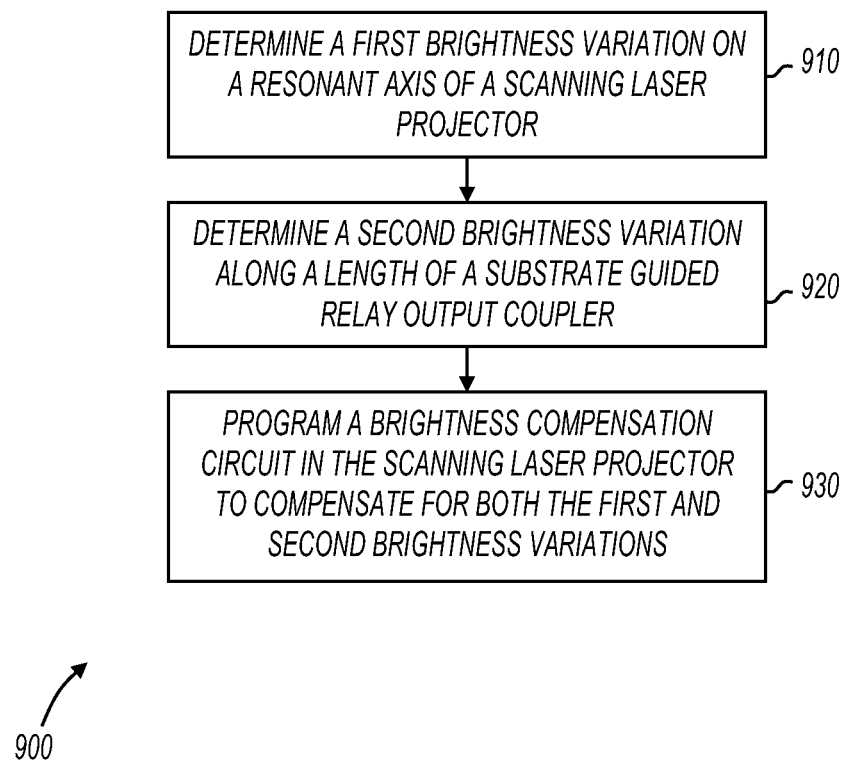
FIG. 9 shows a flowchart of a method in accordance with various embodiments of the present invention.

FIG. 9 shows a flowchart of a method in accordance with various embodiments of the present invention. In some embodiments, method 900, or portions thereof, is performed by a display system, embodiments of which are shown in previous figures. In other embodiments, method 900 is performed by a series of circuits, or a processor that executes instructions, or a combination of the two. Method 900 is not limited by the particular type of apparatus performing the method. The various actions in method 900 may be performed in the order presented, or may be performed in a different order. Further, in some embodiments, some actions listed in FIG. 9 are omitted from method 900.

Method 900 is shown beginning with block 910 in which a first brightness variation is determined. The first brightness variation corresponds to the brightness variation on a resonant axis of a scanning laser projector. The first brightness variation may be determined by empirical measurements, or may be determined mathematically based on system characteristics. For example, actual brightness as a function of mirror phase may be measured. Also for example, brightness variations may be determined from knowledge of the scanning behavior of the scanning laser projector along with known timing of pixels in relation to the scanning behavior. This first brightness variation corresponds to brightness variation 310 (FIG. 3).

At 920, a second brightness variation is determined. The second brightness variation corresponds to the brightness variation along the length of a substrate guided relay output coupler. The second brightness variation may be determined by empirical measurements, or may be determined mathematically based on system characteristics. For example, actual brightness as a function of beam position may be measured. Also for example, brightness variations may be determined from knowledge of the known physical characteristics of the substrate guided relay and output coupler. This second brightness variation corresponds to brightness variation 410 (FIG. 4).

At 930, a brightness compensation circuit in the scanning laser projector is programmed to compensate for both the first and second brightness variations. This corresponds to programming brightness compensation circuit 510 (FIGS. 5A and 5B). In some embodiments, the actions of 930 are performed by loading look up tables with values that correspond to one or more of compensation functions 810, 820, and 830 (FIG. 8).

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a scanning mirror that produces an image by scanning a modulated light beam in two dimensions, wherein the scanning mirror scans sinusoidally in at least one of the two dimensions;
   a substrate guided relay that accepts a scanned light beam reflected from the scanning mirror, a body to guide light to an output coupler having a length, the output coupler to receive the light from the body and output the light at a varying brightness along the length;
   at least one laser light source to produce the modulated light beam in response to a drive signal; and
   a brightness compensation circuit to receive desired pixel values and to produce compensated drive signals as a function of mirror phase by compensating for the varying brightness along the length as well as brightness variations resulting from the sinusoidal scanning.

2. The apparatus of claim 1 wherein the brightness compensation circuit includes a linear compensation component to compensate for the varying brightness along the length of the output coupler and a sinusoidal compensation component to compensate for the brightness variations resulting from the sinusoidal scanning.

3. The apparatus of claim 2 wherein the linear compensation component provides a gain greater than unity for at least one mirror phase.

4. The apparatus of claim 2 wherein the sinusoidal component provides a gain of less than unity for at least one mirror phase.

5. The apparatus of claim 2 wherein the linear compensation component provides a gain greater than unity for at least one mirror phase, and the brightness compensation circuit provides a gain of no more than unity for all mirror phases.

6. The apparatus of claim 1 wherein the brightness compensation component comprises a look up table.

7. The apparatus of claim 1 wherein contents of the lookup table are scaled to a maximum scale factor of one.

* * * * *